Jan. 17, 1928.
J. KEEGAN
1,656,638
BRAKE SHOE
Filed Aug. 26, 1926
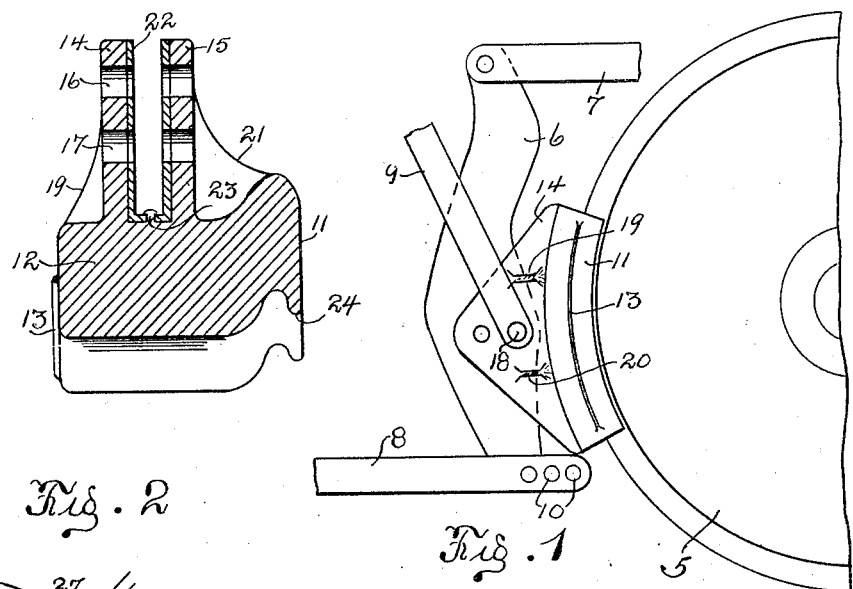
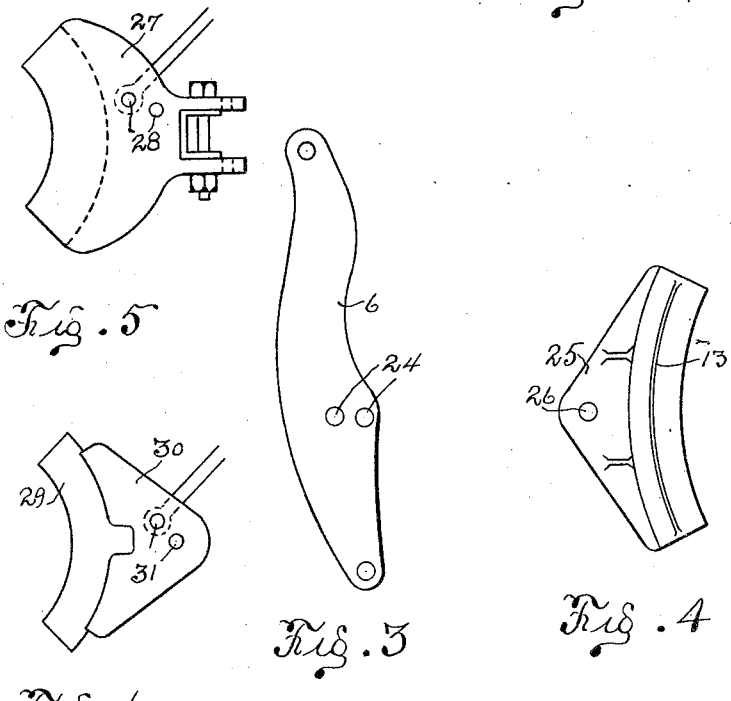
INVENTOR
John Keegan
BY
ATTORNEY Patented Jan. 17, 1928.

1,656,638

UNITED STATES PATENT OFFICE.

JOHN KEEGAN, OF NEW YORK, N. Y.

BRAKE SHOE.

Application filed August 26, 1926. Serial No. 131,736.

The device, the subject of this invention is an adjustable brake shoe and support therefor and the particular object of the invention is to make it possible to employ a shoe that will wear longer than the shoe now used and to adjust the position of the shoe.

Brake shoes generally consist of a body member and an insert. The insert is removable and is removed when worn to a pre-determined point. The limited space makes it necessary for the thickness of the insert to be limited, which occasions frequent changes of inserts. The unused portion of the insert is a loss as it becomes scrap metal of very low value.

Another object of this invention is, then, to overcome the necessity for frequent changes and to reduce the amount of scrap and I have so constructed my brake shoe and the supporting means therefor that the adjustment to the so-called second wear position may be very quickly made.

The following is what I consider the best means of carrying out my invention and the accompanying drawing should be referred to for a complete understanding of the specification which follows.

In the drawing:—

Fig. 1 shows in side elevation, a portion of a wheel with the brake shoe in operative relation therewith.

Fig. 2 is an enlarged, sectional view of the brake shoe.

Fig. 3 shows a brake lever of modified construction.

Fig. 4 shows a brake shoe adapted to be employed with the lever shown in Fig. 3.

Fig. 5 shows in side elevation a beam supported adjustable brake shoe.

Fig. 6 shows in side elevation a two piece adjustable brake shoe.

Similar reference numerals indicate like parts in all the figures where they appear.

At 5 in Fig. 1, I show a car wheel and at 6 a brake lever with the brake operating rods 7 and 8 attached thereto and the supporting link 9 in position. All of these parts are of ordinary construction, shape and size, and their location need not be changed from the ordinary, for use with my brake.

The plurality of holes 10 in the rod 8 are the adjustment holes now found in similar rods.

My brake shoe is shown at 11 and consists of a particularly heavy faced member 12, the thickness of this member being approximately twice the thickness of the usual insert or face of the ordinary brake shoe.

At 13 and at one side of my brake shoe I arrange a rib, a thin projection or mark and which I term a wear mark. When, by constant use, the brake shoe is worn to this mark the shoe should be reset in a manner which I will describe.

The outwardly extending lugs 14 and 15 of the brake shoe are provided with a plurality of perforations as shown at 16 and 17. A pin 18 passes through one of these perforations and through the brake lever 6, and when the shoe is worn to the line 13, the pin 18 is removed, the shoe advanced toward the wheel 5 and the pin inserted into the outer perforation 16. The link 9 should of course be maintained upon the pin 18.

I provide a plurality of ribs as shown at 19, 20 and 21 for supporting the lugs 14 and 15, and these ribs may be ordinary webs of desired thickness.

I call particular attention to the U-shaped insert member 22 arranged between the lugs 14 and 15. This insert member should be of sheet steel, should be provided with perforations 23 and should be placed in the mould before the brake shoe is cast so that the casting metal may enter the perforations 23, to secure the U-shaped member 22 in position. It will be noted that my shoe is provided with an ordinary flanged overhang 24.

In Figs. 3 and 4, I show a combination of a brake shoe and lever, but in this combination the lever is provided with a plurality of perforations 24, and the lugs 25 of the brake shoe are of less width and are provided with a single perforation 26.

It will be understood that the same adjustment can be obtained through this combination and the full value of a double wear brake shoe maintained.

In Fig. 5 I show a beam supported brake shoe 27. This is also a one piece brake shoe having projecting webs or lugs provided with a plurality of perforations 28 for the purpose of adjustment.

In Fig. 6, I show an adjustable two piece brake shoe, wherein, the wear member 29 is supported in a holding or retaining means 30. The member 30 being provided with a plurality of outstanding lugs perforated at 31 to provide for adjustment.

I may provide the ordinary means for preventing chipping of the brake shoe but such means are so well known that I deem it unnecessary to show or describe them.

I desire to emphasize that my brake consists preferably of an integrally formed shoe with projecting lugs constituting a large mass of metal which will more readily dissipate the heat caused by the frictional engagement of the brake to wheel during the braking action, and which will result in increased efficiency, due to a cooler shoe and increased co-efficient of friction, adding materially to the life of the brake shoe.

Modifications may be made within the scope of the appended claims, without departing from the principle or sacrificing the advantages of the invention.

Having carefully and fully described my invention, what I claim and desire to obtain is:—

1. A metallic brake shoe having a heavy faced member and a supporting lug formed integral therewith, said lug being provided with a plurality of perforations to allow the position of said shoe to be changed at will.

2. A brake shoe having a plurality of lugs formed integral therewith and a sheet metal member between said lugs.

3. A brake shoe having a plurality of lugs formed integral therewith, a wear indicating rib upon an exposed surface of said shoe, a U-shaped member between said lugs, said lugs and said U-shaped member being provided with a plurality of perforations.

4. A brake shoe having an elongated supporting lug formed integral therewith, said lug being provided with a plurality of perforations to allow the position of said shoe to be adjusted.

Signed at the city, county and State of New York, this 19th day of April, 1926.

JOHN KEEGAN.